(12) United States Patent
Abe et al.

(10) Patent No.: US 10,597,933 B2
(45) Date of Patent: Mar. 24, 2020

(54) GLASS PANEL UNIT AND WINDOWPANE

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/763,787

(22) PCT Filed: Sep. 14, 2016

(86) PCT No.: PCT/JP2016/004183
§ 371 (c)(1),
(2) Date: Mar. 27, 2018

(87) PCT Pub. No.: WO2017/056422
PCT Pub. Date: Apr. 6, 2017

(65) Prior Publication Data
US 2018/0320436 A1 Nov. 8, 2018

(30) Foreign Application Priority Data
Sep. 29, 2015 (JP) .................................. 2015-192249

(51) Int. Cl.
*E06B 7/02* (2006.01)
*E06B 3/677* (2006.01)
(Continued)

(52) U.S. Cl.
CPC ................ *E06B 7/02* (2013.01); *C03C 27/06* (2013.01); *E06B 3/6612* (2013.01); *E06B 3/677* (2013.01);
(Continued)

(58) Field of Classification Search
CPC .......... E06B 7/02; E06B 3/6612; E06B 3/677; E06B 2007/026; C03C 27/06
See application file for complete search history.

(56) References Cited

U.S. PATENT DOCUMENTS 2,125,372 A * 8/1938 Fox ........................ C03B 23/245
220/304
2,429,546 A * 10/1947 Martin ............... G05D 16/0619
137/505.23
(Continued)

FOREIGN PATENT DOCUMENTS

CN 102010142 A 4/2011
CN 104302593 A 1/2015
(Continued)

OTHER PUBLICATIONS

International Search Report and Written Opinion issue in International Application No. PCT/JP2016/004183, dated Dec. 13, 2016; with partial English translation.

*Primary Examiner* — Brent W Herring
(74) *Attorney, Agent, or Firm* — McDermott Will & Emery LLP

(57) ABSTRACT

A glass panel unit includes a first pane of glass, and a second pane of glass facing the first pane of glass with the panes of glass spaced a predetermined interval apart. The glass panel includes a seal disposed between the panes of glass and joined to them in an airtight manner, and an interior space encompassed with the panes of glass and the seal. The glass panel unit includes: a partition wall disposed in the interior space and divides the interior space into a first space as a
(Continued)

vacuum space and a second space; an air release vent formed in a first or second pane of glass and communicates with the second space; and a blocking member provided in the air release vent.

4 Claims, 12 Drawing Sheets

(51) Int. Cl.
    *C03C 27/06*     (2006.01)
    *E06B 3/66*     (2006.01)

(52) U.S. Cl.
    CPC ...... *E06B 3/6775* (2013.01); *E06B 2007/026* (2013.01); *Y02A 30/25* (2018.01); *Y02B 80/24* (2013.01)

(56) References Cited

U.S. PATENT DOCUMENTS

| | | | | |
|---|---|---|---|---|
| 4,065,894 A * | 1/1978 | Day | ............ | E06B 3/64 52/171.3 |
| 4,459,789 A * | 7/1984 | Ford | ............ | E06B 3/24 52/171.3 |
| 4,542,611 A * | 9/1985 | Day | ............ | E06B 3/677 52/172 |
| 4,567,703 A * | 2/1986 | Ricks | ............ | E06B 3/677 52/171.3 |
| 4,604,840 A * | 8/1986 | Mondon | ............ | E06B 1/6015 52/172 |
| 4,835,926 A * | 6/1989 | King | ............ | E06B 3/677 428/34 |
| 4,942,704 A * | 7/1990 | King | ............ | E06B 3/677 428/34 |
| 5,664,395 A * | 9/1997 | Collins | ............ | E06B 3/6612 52/786.13 |
| 6,109,994 A * | 8/2000 | Cho | ............ | H01J 9/261 445/25 |
| 6,553,728 B1 * | 4/2003 | Zurn | ............ | E06B 3/677 251/215 |
| 6,827,623 B2 * | 12/2004 | Nakatake | ............ | H01J 9/261 445/24 |
| 6,916,392 B2 * | 7/2005 | Trpkovski | ............ | B23B 49/005 141/59 |
| 7,281,561 B2 * | 10/2007 | Anderson | ............ | E06B 9/264 160/121.1 |
| 7,490,445 B2 * | 2/2009 | Steffek | ............ | E06B 3/24 156/109 |
| 7,588,653 B2 * | 9/2009 | Crandell | ............ | E06B 3/24 156/109 |
| 7,833,592 B2 * | 11/2010 | Pilloy | ............ | C03C 27/10 428/34 |
| 7,997,037 B2 * | 8/2011 | Crandell | ............ | E06B 3/24 52/172 |
| 8,099,916 B2 * | 1/2012 | Joasil | ............ | E06B 7/02 454/122 |
| 8,916,245 B2 * | 12/2014 | Mansour, II | ............ | B01J 3/00 359/894 |
| 9,290,986 B2 * | 3/2016 | Kotowski | ............ | E06B 3/677 |
| 10,024,098 B2 * | 7/2018 | Abe | ............ | C03C 27/06 |
| 10,036,194 B2 * | 7/2018 | Abe | ............ | C03C 27/06 |
| 2002/0046797 A1 * | 4/2002 | Collins | ............ | C03C 27/06 156/107 |
| 2002/0197422 A1 * | 12/2002 | Trpkovski | ............ | B23B 49/005 428/34 |
| 2005/0028459 A1 * | 2/2005 | Crandell | ............ | E06B 3/24 52/204.5 |
| 2005/0028460 A1 * | 2/2005 | Steffek | ............ | E06B 3/24 52/204.5 |
| 2005/0034386 A1 * | 2/2005 | Crandell | ............ | E06B 3/24 52/204.5 |
| 2005/0132558 A1 * | 6/2005 | Hennessy | ............ | E06B 3/677 29/525 |
| 2006/0154005 A1 * | 7/2006 | Misonou | ............ | C03C 27/10 428/34 |
| 2007/0033887 A1 * | 2/2007 | Ambrose | ............ | E06B 3/677 52/171.3 |
| 2008/0026166 A1 * | 1/2008 | Pilloy | ............ | C03C 27/10 428/34 |
| 2008/0104900 A1 * | 5/2008 | Joasil | ............ | E06B 3/677 52/171.3 |
| 2008/0245011 A1 * | 10/2008 | Friedl | ............ | E06B 3/6612 52/407.5 |
| 2008/0302059 A1 * | 12/2008 | Du Plessis | ............ | E06B 3/6775 52/786.11 |
| 2009/0009707 A1 * | 1/2009 | Kurosaki | ............ | G02F 1/1303 349/154 |
| 2009/0151854 A1 * | 6/2009 | Cooper | ............ | C03C 8/24 156/109 |
| 2010/0310797 A1 * | 12/2010 | Mansour, II | ............ | B01J 3/00 428/34 |
| 2012/0067611 A1 | 3/2012 | Kohda | | |
| 2013/0101759 A1 | 4/2013 | Jones | | |
| 2014/0186556 A1 * | 7/2014 | Dear | ............ | E06B 3/26345 428/34 |
| 2014/0314973 A1 * | 10/2014 | Desroches | ............ | B64C 1/1492 428/34 |
| 2015/0068666 A1 | 3/2015 | Abe et al. | | |
| 2015/0322708 A1 * | 11/2015 | Kotowski | ............ | E06B 3/677 52/172 |
| 2016/0001524 A1 * | 1/2016 | Abe | ............ | E06B 3/6612 428/33 |
| 2016/0061680 A1 * | 3/2016 | Knijnenburg | ............ | G01L 13/06 73/753 |

FOREIGN PATENT DOCUMENTS

| | | |
|---|---|---|
| JP | 2001-316138 A | 11/2001 |
| JP | 2002-137940 A | 5/2002 |
| TW | I525757 B | 3/2016 |
| WO | 2013/172033 A1 | 11/2013 |

* cited by examiner

GLASS PANEL UNIT AND WINDOWPANE

RELATED APPLICATIONS

This application is the U.S. National Phase under 35 U.S.C. § 371 of International Patent Application No. PCT/JP2016/004183, filed on Sep. 14, 2016, which in turn claims the benefit of Japanese Application No. 2015-192249, filed on Sep. 29, 2015, the entire disclosures of which Applications are incorporated by reference herein.

TECHNICAL FIELD

The invention relates to a glass panel unit and a windowpane.

BACKGROUND ART

Patent Document 1 discloses a glass panel unit. The glass panel unit described in Patent Document 1 includes a first pane of glass and a second pane of glass that faces the first pane of glass with the two panes of glass spaced a predetermined interval apart. It is also provided with a seal that is disposed between the first pane of glass and the second pane of glass and is joined to them in an airtight manner, and an interior space encompassed with the first pane of glass, the second pane of glass and the seal. It is further provided with a partition wall that is disposed in the interior space and divides the interior space into a first space as a vacuum space and a second space, and an air release vent that is formed in the first pane of glass or the second pane of glass and communicates with the second space.

CITATION LIST

Patent Literature

Patent Document 1: WO2013/172033 A1

SUMMARY OF INVENTION

With the glass panel unit disclosed Patent Document 1, there is a tendency for foreign matter such as dust to enter the second space via the air release vent.

It is an object of the present invention to obtain a glass panel unit and a windowpane, capable of preventing foreign matter from entering a second space via an air release vent.

A glass panel unit according to an aspect of the present invention includes a first pane of glass, a second pane of glass, a seal, an interior space, a partition wall, an air release vent and a blocking member. The second pane of glass faces the first pane of glass with the two panes of glass spaced a predetermined interval apart. The seal is disposed between the first pane of glass and the second pane of glass and is joined to the first pane of glass and the second pane of glass in an airtight manner. The interior space is encompassed with the first pane of glass, the second pane of glass and the seal. The partition wall is disposed in the interior space and divides the interior space into a first space as a vacuum space and a second space. The air release vent is formed in the first pane of glass or the second pane of glass and communicates with the second space. The blocking member is provided in the air release vent.

A windowpane according to a second aspect of the present invention includes the glass panel unit, and a window frame that a periphery of the glass panel unit is fit in.

The glass panel unit according to the aspect of the present invention prevents foreign matter from entering the second space via the air release vent.

The second aspect of the present invention enables an improvement in thermal insulation efficiency of the windowpane.

DESCRIPTION OF EMBODIMENTS

Each of a first embodiment to a fourth embodiment below relates to a glass panel unit (the fourth embodiment further relates to a windowpane) and, more particularly, to a glass panel unit including a first pane of glass, a second pane of glass that faces the first pane of glass with the two panes of glass spaced a predetermined interval apart, and a seal that is disposed between the first pane of glass and the second pane of glass and is joined to the first pane of glass and the second pane of glass in an airtight manner.

Figure 1:
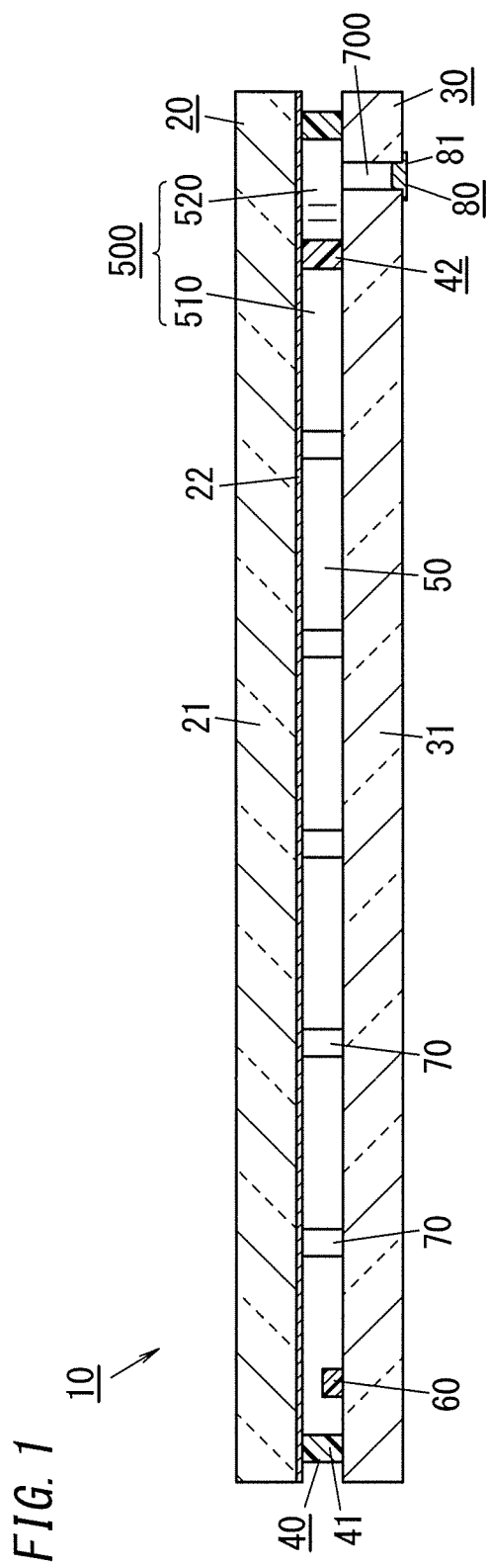
FIG. 1 is a schematic sectional view of a glass panel unit according to a first embodiment of the present invention.
Figure 2:
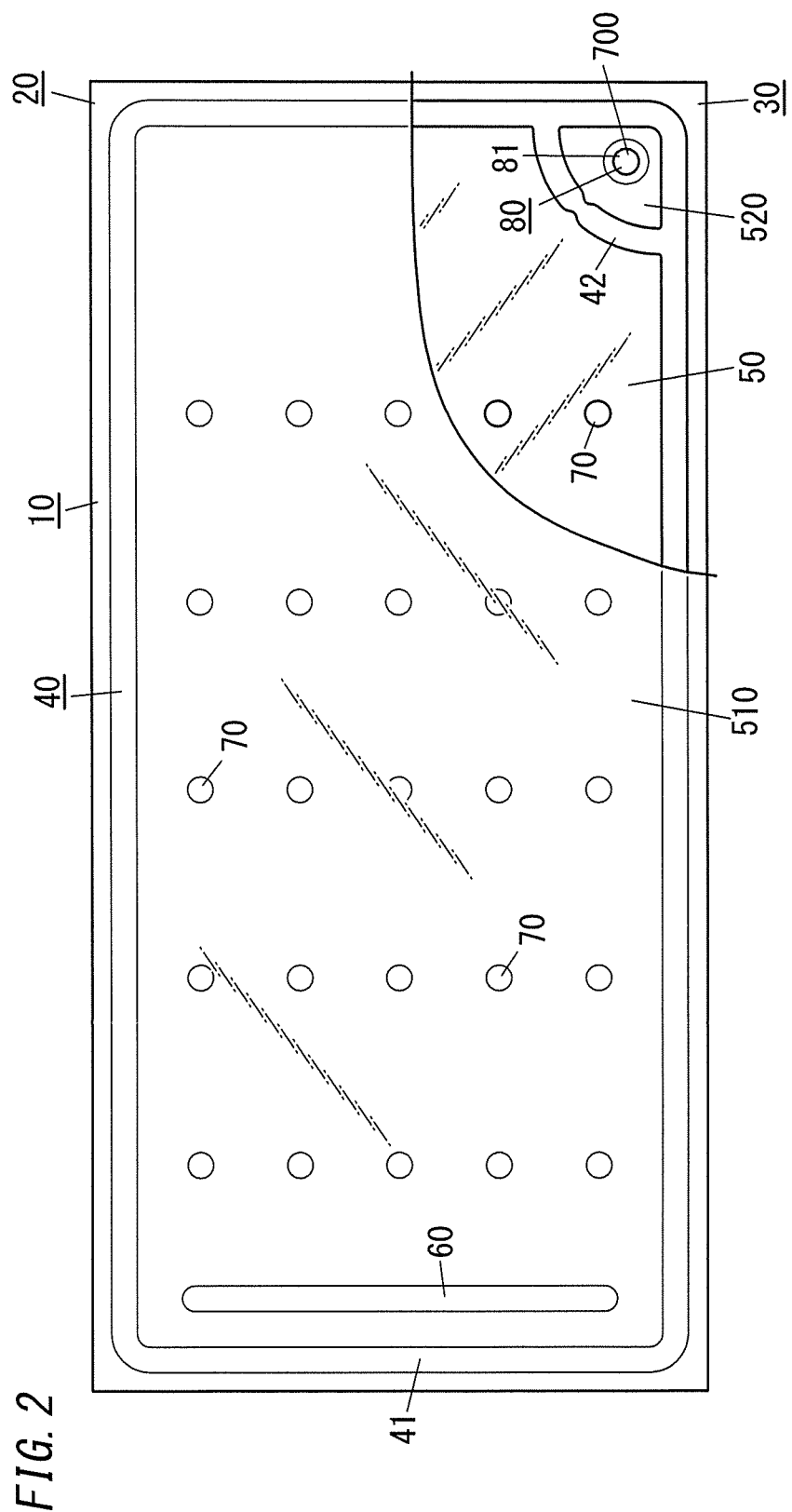
FIG. 2 is a partially broken schematic plan of the glass panel unit.

FIGS. 1 and 2 show a glass panel unit 10 (a glass panel unit as a finished product) according to the first embodiment. The glass panel unit 10 according to the first embodiment is a vacuum insulated glazing unit. The vacuum insulated glazing unit is a kind of insulating glass including at least two panes of glass that are paired, and has a vacuum space in the two panes of glass.

The glass panel unit 1 according to the first embodiment includes a first pane of glass 20, a second pane of glass 30, a seal 40, a vacuum space 50, a gas adsorbent 60, spacers 70 and a blocking member 80.

Figure 3:
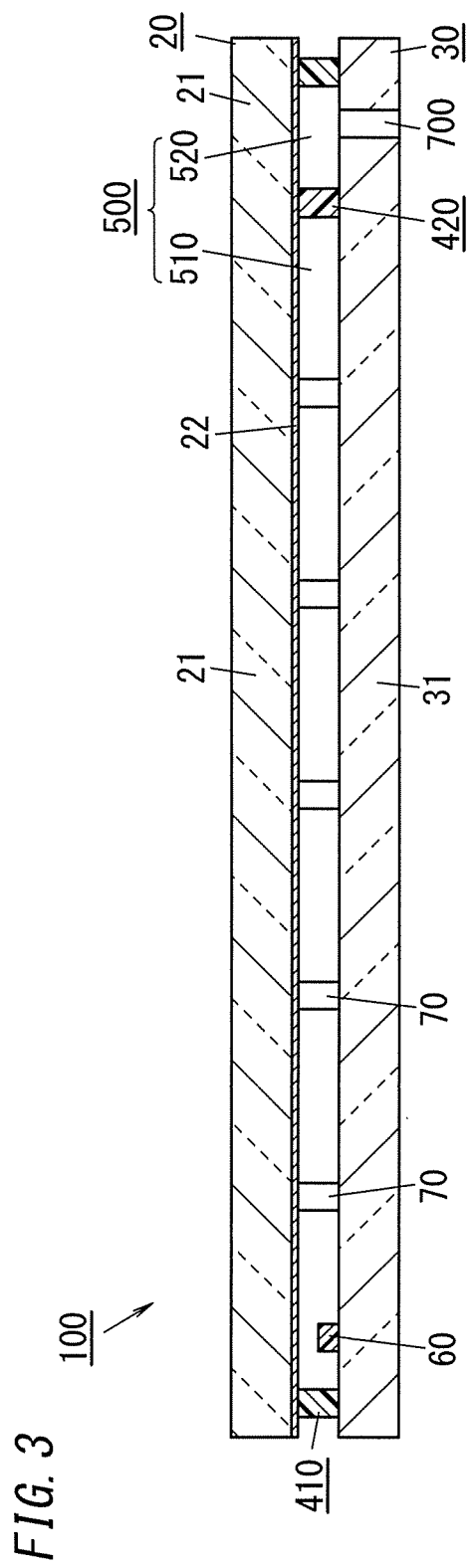
FIG. 3 is a schematic sectional view of a temporary assembly of the glass panel unit.
Figure 4:
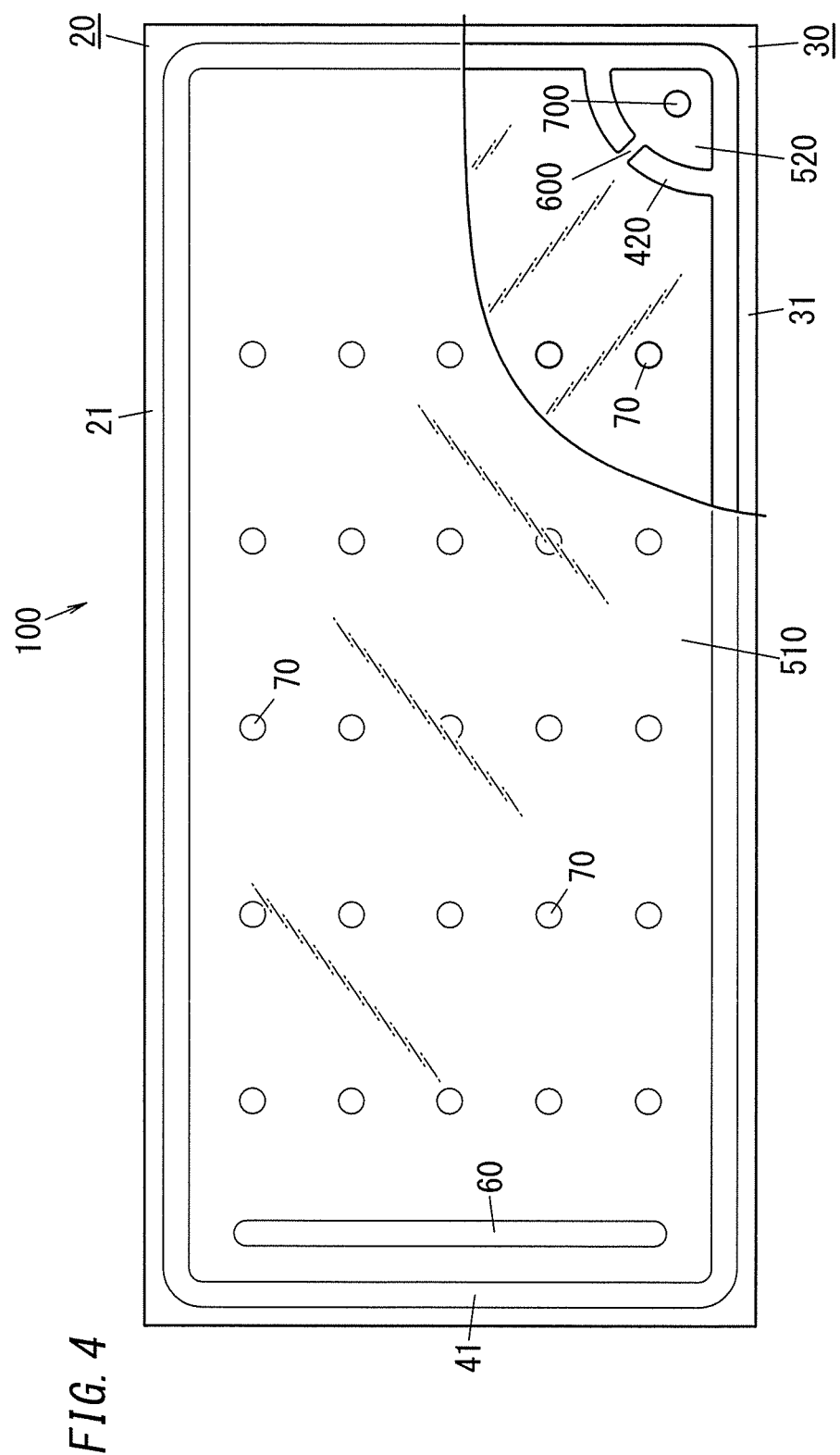
FIG. 4 is a partially broken schematic plan of the temporary assembly.

The glass panel unit 10 (the glass panel unit as the finished product) is obtained by performing a predetermined process with respect to a temporary assembly 100 shown in FIGS. 3 and 4.

The temporary assembly 100 includes the first pane of glass 20, the second pane of glass 30, a frame body 410, an interior space 500, a partition 420, an air passage 600, an air release vent 700, the gas adsorbent 60 and the spacers 70.

The first pane of glass 20 includes a plate glass 21 defining a plane form of the first pane of glass 20, and a coating 22.

The plate glass 21 is a flat rectangular plate and has a first surface (lower surface in FIG. 3) and a second surface (upper surface in FIG. 3) that are parallel to each other on both sides of a thickness direction of the plate glass 21. Each of the first and second surfaces of the plate glass 21 is a plane. Examples of material of the plate glass 21 include soda lime glass, high strain point glass, chemically toughened glass, non-alkali glass, silica glass, Neoceram, and thermally toughened glass.

The coating 22 is formed on the first surface of the plate glass 21. The coating 22 is an infrared reflection film. Note that the coating 22 is not limited to the infrared reflection film, but may be a film having specific physical property. Note that the first pane of glass 20 may be composed of only the plate glass 21. In short, the first pane of glass 20 is composed of at least the plate glass 21.

The second pane of glass 30 includes a plate glass 31 defining a plane form of the second pane of glass 30. The plate glass 31 is a flat rectangular plate and has a first surface (upper surface in FIG. 3) and a second surface (lower surface in FIG. 3) that are parallel to each other on both sides of a thickness direction of the plate glass 31. Each of the first and second surfaces of the plate glass 31 is a plane.

The plane form and plane size of the plate glass 31 are the same as those of the plate glass 21 (namely, the plane form of the second pane of glass 30 is the same as that of first pane of glass 20). The thickness of the plate glass 31 is the same as that of the plate glass 21. Examples of material of the plate glass 31 include soda lime glass, high strain point glass, chemically toughened glass, non-alkali glass, silica glass, Neoceram, and thermally toughened glass.

The second pane of glass 30 is composed of only the plate glass 31. That is, the plate glass 31 alone forms the second pane of glass 30. Note that a coating may be formed on any surface of the second pane of glass 30. The coating is a film having specific physical property like an infrared reflection film or the like. In this case, the second pane of glass 30 is composed of the plate glass 31 and the coating. In short, the second pane of glass 30 is composed of at least the plate glass 31.

The second pane of glass 30 faces the first pane of glass 20. Specifically, the first pane of glass 20 and the second pane of glass 30 are arranged so that the first surface of the plate glass 21 faces and runs parallel to the first surface of the plate glass 31.

The frame body 410 is disposed between the first pane of glass 20 and the second pane of glass 30 and is joined to the first pane of glass 20 and the second pane of glass 30 in an airtight manner. Accordingly, the interior space 500 encompassed with the frame body 410, the first pane of glass 20 and the second pane of glass 30 is provided.

The frame body 410 is made from thermal bonding material (first thermal bonding material having a first softening point). The first thermal bonding material is, for example glass frit. The glass frit is, for example low melting point glass frit. Examples of the low melting point glass frit include bismuth-based glass fit, lead-based glass frit, and vanadium-based glass frit.

The frame body 410 is frame rectangular in shape. The plane form of the frame body 410 is the same as each plane form of the plate glass 21 and the plate glass 31, but the plane size of the frame body 410 is smaller than each plane size of the plate glass 21 and the plate glass 31. The frame body 410 is formed around the periphery of the second pane of glass 30. That is, the frame body 410 is formed to surround almost every region on the second pane of glass 30.

The first thermal bonding material as the frame body 410 is once melted at a predetermined temperature (a first melting temperature) Tm1 that is higher than or equal to the first softening point, thereby joined to the first pane of glass 20 and the second pane of glass 30 in an airtight manner.

The partition 420 is disposed in the interior space 500. The partition 420 divides the interior space 500 into a first space 510 and a second space 520, where the first space 510 is an encapsulated space (namely the vacuum space 50 encapsulated when the glass panel unit 10 as the finished product is obtained), and the second space 520 is an air release space and communicates with the air release vent 700. The partition 420 is formed at a first end side than the center of the second pane of glass 30 in a lengthwise direction thereof with the first space 510 being larger than the second space 520, where the first end side is a right end side in FIG. 4 and the lengthwise direction is a right-left direction in FIG. 4.

The partition 420 is made from thermal bonding material (second thermal bonding material having a second softening point). The second thermal bonding material is, for example glass frit. The glass frit is, for example low melting point glass frit. Examples of the low melting point glass frit further include bismuth-based glass frit, lead-based glass frit, and vanadium-based glass frit. The second thermal bonding material is the same as the first thermal bonding material, and has the second softening point that is equal to the first softening point.

The air release vent 700 is a hole that connects the second space 520 and an exterior space. The air release vent 700 is provided for releasing air inside the first space 510 via the second space 520 and the air passage 600. The air release vent 700 is formed in the second pane of glass 30 to connect the second space 520 and the exterior space. Specifically, the air release vent 700 is formed in a corner of the second pane of glass 30. Note that the air release vent 700 is provided in the second pane of glass 30 in the first embodiment, but may be provided in the first pane of glass 20 or both the first pane of glass 20 and the second pane of glass 30.

The gas adsorbent 60 is disposed in the first space 510. Specifically, the gas adsorbent 60 is elongated in shape and formed along a widthwise direction of the second pane of glass 30 on a second end side in the lengthwise direction of the second pane of glass 30, where the second end side is a left end side in FIG. 4. That is, the gas adsorbent 60 is disposed at an end of the first space 510 (the vacuum space 50). This enables the gas adsorbent 60 to look inconspicuous. The gas adsorbent 60 is spaced apart from the partition 420 and the air passage 600. It is accordingly possible to prevent the gas adsorbent 60 from interrupting air release from the first space 510 when air is released therefrom.

The gas adsorbent 60 is provided for adsorbing unnecessary gas (residual gas). Examples of the unnecessary gas include a gas discharged from the frame body 410 and the partition 420 when the frame body 410 and the partition 420 are heated.

The gas adsorbent 60 has a getter. The getter is adsorbent material for adsorbing molecules whose size is smaller than a specific size. The getter is, for example an evaporation type getter. The evaporation type getter has a property capable of discharging adsorbed molecules at a temperature higher than or equal to a specific temperature (an activation temperature). Therefore, even if adsorption capacity of the evaporation type getter decreases, heating the evaporation type getter at the activation temperature or higher enables recovery in the adsorption capacity of the evaporation type getter. Examples of the evaporation type getter include zeolite, and ion-exchanged zeolite (e.g., copper ion exchanged zeolite).

The gas adsorbent 60 includes a granular material as the getter. Specifically, the gas adsorbent 60 is formed by applying a solution in which grains in the granular material as the getter are dispersed. In this case, the gas adsorbent 60 can be made smaller. Therefore, even if the vacuum space 50 is narrow, the gas adsorbent 60 can be disposed.

The spacers 70 are provided for maintaining the interval between the first pane of glass 20 and the second pane of glass 30 at a predetermined interval. That is, the spacers 70 are provided for maintaining a distance between the first pane of glass 20 and the second pane of glass 30 at a predetermined value.

The spacers 70 are arranged in the first space 510. Specifically, the spacers 70 are disposed at respective vertices of a virtual rectangular grid. Each interval of the spacers 70 is, for example 2 cm. Note that respective sizes and intervals of the spacers 70, and the number of and an arrangement pattern of the spacers 70 may be selected appropriately.

Each of the spacers 70 is cylindrical in shape and has a height that is almost the same as the predetermined interval. For example, each of the spacers 70 is 1 mm in diameter and 100 μm in height. Note that each of the spacers 70 may have a predetermined shape such as a rectangular column or a spherical shape.

The spacers 70 are made from transparent material. Note that each of the spacers 70 may be made from opaque material if it is sufficiently small. The material of the spacers 70 is selected such that the spacers 70 is prevented from being deformed in a first melting process, an air releasing process and a second melting process to be described later. Examples of the material of the spacers 70 include material whose softening point (a softening temperature) is higher than the first softening point of the first thermal bonding material and the second softening point of the second thermal bonding material.

The temporary assembly 100 is subjected to the above-mentioned predetermined process in order to obtain the glass panel unit 10 as the finished product.

The predetermined process includes releasing air from the first space 510 via the air passage 600, the second space 520 and the air release vent 700 at a predetermined temperature (an air release temperature) Te, thereby making the first space 510 change to the vacuum space 50. The air release temperature Te is higher than the activation temperature of the getter as the gas adsorbent 60. Thus, air is released from the first space 510 while at the same time the adsorption capacity of the getter is recovered.

As shown in FIG. 2, the predetermined process includes deforming the partition 420 to form a partition wall 42 that blocks the air passage 600, thereby forming the seal 40 that surrounds the vacuum space 50. Since the partition 420 contains the second thermal bonding material, the second thermal bonding material is once melted at a predetermined temperature (a second melting temperature) Tm2 that is higher than or equal to the second softening point, thereby making it possible to deform the partition 420 to form the partition wall 42. Note that the first melting temperature Tm1 is lower than the second melting temperature Tm2. It is accordingly possible to prevent the partition 420 from being deformed to block the air passage 600 when the frame body 410 is joined to the first pane of glass 20 and the second pane of glass 30.

The partition 420 is deformed so as to block the air passage 600 as shown in FIG. 2. The partition wall 42 obtained by deforming the partition 420 separates (spatially separates) the vacuum space 50 from the second space 520. The partition wall 42 as a second part and part of the frame body as a first part corresponding to the vacuum space 50 constitute the seal 40 that surrounds the vacuum space 50.

As shown in FIG. 2, the glass panel unit 10 as the finished product obtained in this way includes the first pane of glass 20, the second pane of glass 30, the seal 40, the vacuum space 50, the second space 520, the gas adsorbent 60, the spacers 70 and blocking member 80.

The vacuum space 50 is formed by releasing air from the first space 510 via the second space 520 and the air release vent 700 as stated above. In other words, the vacuum space 50 is the first space 510 whose degree of vacuum is a predetermined value or less. The predetermined value is, for example 0.1 Pa. The vacuum space 50 is completely sealed with the first pane of glass 20, the second pane of glass 30 and the seal 40, and therefore separated from the second space 520 and the air release vent 700.

The seal 40 completely surrounds the vacuum space 50 with the seal 40 joined to the first pane of glass 20 and the second pane of glass 30 in an airtight manner. The seal 40 has a frame shape and includes the first part 41 and the second part 42. The first part 41 is the part of the frame body 410 corresponding to the vacuum space 50. That is, the first part 41 is the part of the frame body 410 that faces the vacuum space 50. The second part 42 is a partition wall obtained by deforming the partition 420.

The blocking member 80 is provided for preventing foreign matter such as dust from entering the second space 520 via the air release vent 700. In the first embodiment, the blocking member 80 is a cover 81 that is provided at a surface side of the air release vent 700 in the first pane of glass 20 or the second pane of glass 30.

Thus, the blocking member 80 is provided in the air release vent 700, thereby preventing foreign matter such as dust from entering the second space 520 via the air release vent 700. It is accordingly possible to prevent foreign matter such as dust from entering the air release vent 700 or the second space 520 to deteriorate the appearance of the glass panel unit 10.

Since the blocking member 80 is composed of the cover 81, the blocking member 80 can be made easily.

A production method of the glass panel unit 10 according to the first embodiment will hereinafter be explained with reference to FIGS. 5 to 8.

The production method of the glass panel unit 10 according to the first embodiment includes a preparation process, an assembling process, a sealing process and a releasing process. Note that the preparation process may be omitted.

The preparation process includes forming the first pane of glass 20, the second pane of glass 30, the frame body 410, the partition 420, the interior space 500, the air passage 600, the air release vent 700 and the gas adsorbent 60 in order to obtain the temporary assembly 100. The preparation process includes first to sixth processes. Note that the order of the second to sixth processes may be changed appropriately.

The first process (a pane forming process) includes forming the first pane of glass 20 and the second pane of glass 30. For example, the first process includes producing the first pane of glass 20 and the second pane of glass 30. The first process also includes cleaning the first pane of glass 20 and the second pane of glass 30 if necessary.

The second process includes forming the air release vent 700. In the second process, the air release vent 700 is formed in the second pane of glass 30. The second process also includes cleaning the second pane of glass 30 if necessary.

The third process (a seal member forming process) includes forming the frame body 410 and the partition 420. The third process includes applying the first thermal bonding material as material of the frame body 410 and the second thermal bonding material as material of the partition 420 on the second pane of glass 30 (the first surface of the plate glass 31) with a dispenser or the like.

The third process includes drying and temporarily firing the material of the frame body 410 and the material of the partition 420. For example, the third process includes heating the second pane of glass 30 to which the material of the frame body 410 and the material of the partition 420 are applied. Note that the first pane of glass 20 and the second pane of glass 30 may be heated together. That is, the first pane of glass 20 may be heated under conditions same as those of the second pane of glass 30. It is accordingly possible to reduce the difference between warpage of the first pane of glass 20 and warpage of the second pane of glass 30.

The fourth process (a spacer forming process) includes forming the spacers 70. In the fourth process, the spacers 70 is formed in advance and the spacers 70 are arranged in respective positions of the second pane of glass 30 with a chip mounter or the like. Note that the spacers 70 may be formed by photolithography technique and etching technology. In this case, the spacers 70 are made from photosetting material or the like. Alternatively, the spacers 70 may be formed by known thin film coating technology.

The fifth process (a gas adsorbent forming process) includes forming the gas adsorbent 60. In the fifth process, a solution in which grains in the granular material as the getter are dispersed is applied in position of the second pane of glass 30 and dried, and thereby the gas adsorbent 60 is formed.

Figure 5:
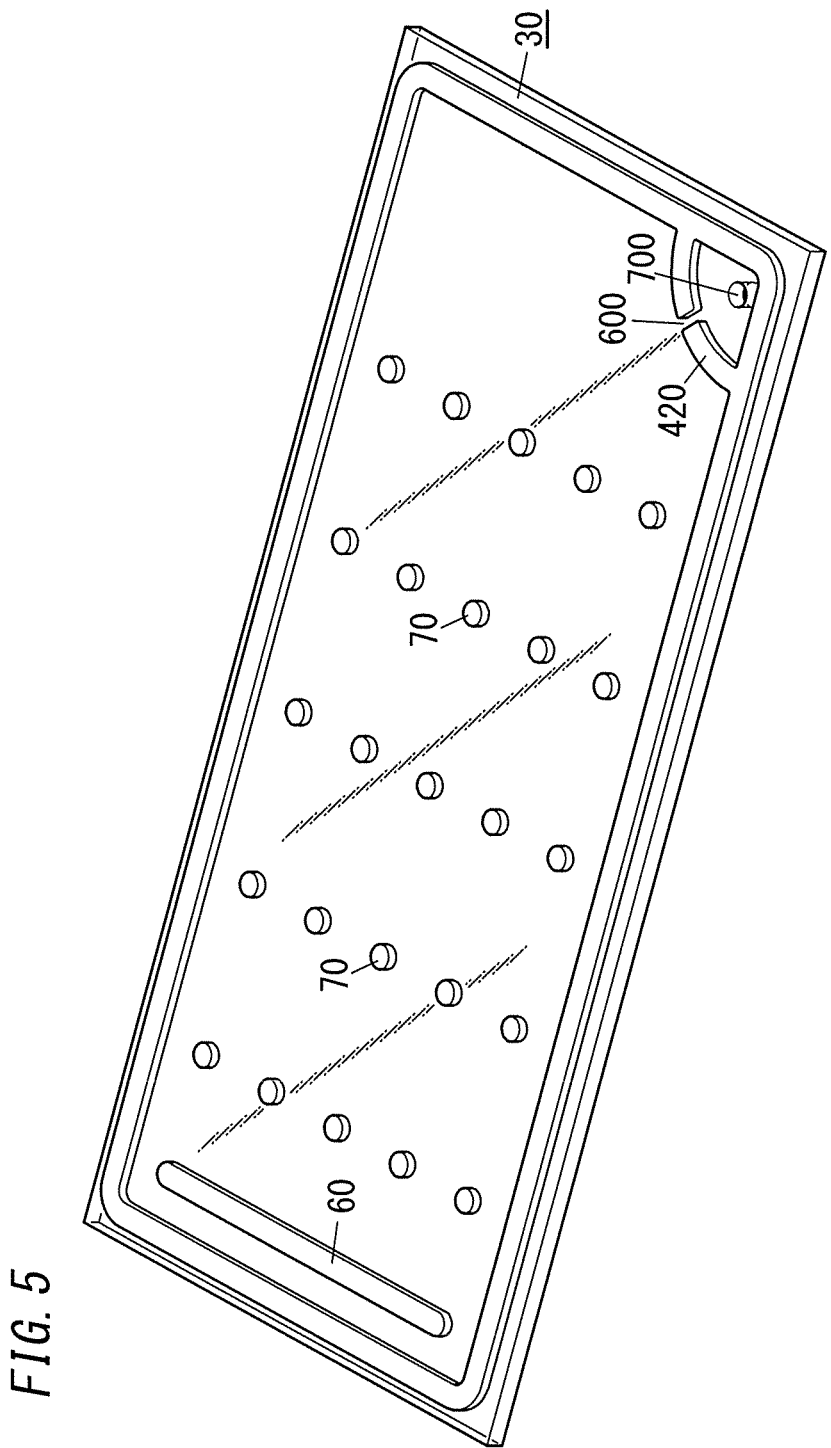
FIG. 5 illustrates the glass panel unit.

On completion of the first to fifth processes, the second pane of glass 30 including the frame body 410, the partition 420, the air passage 600, the air release vent 700, the gas adsorbent 60 and the spacers 70 as shown in FIG. 5 is obtained.

Figure 6:
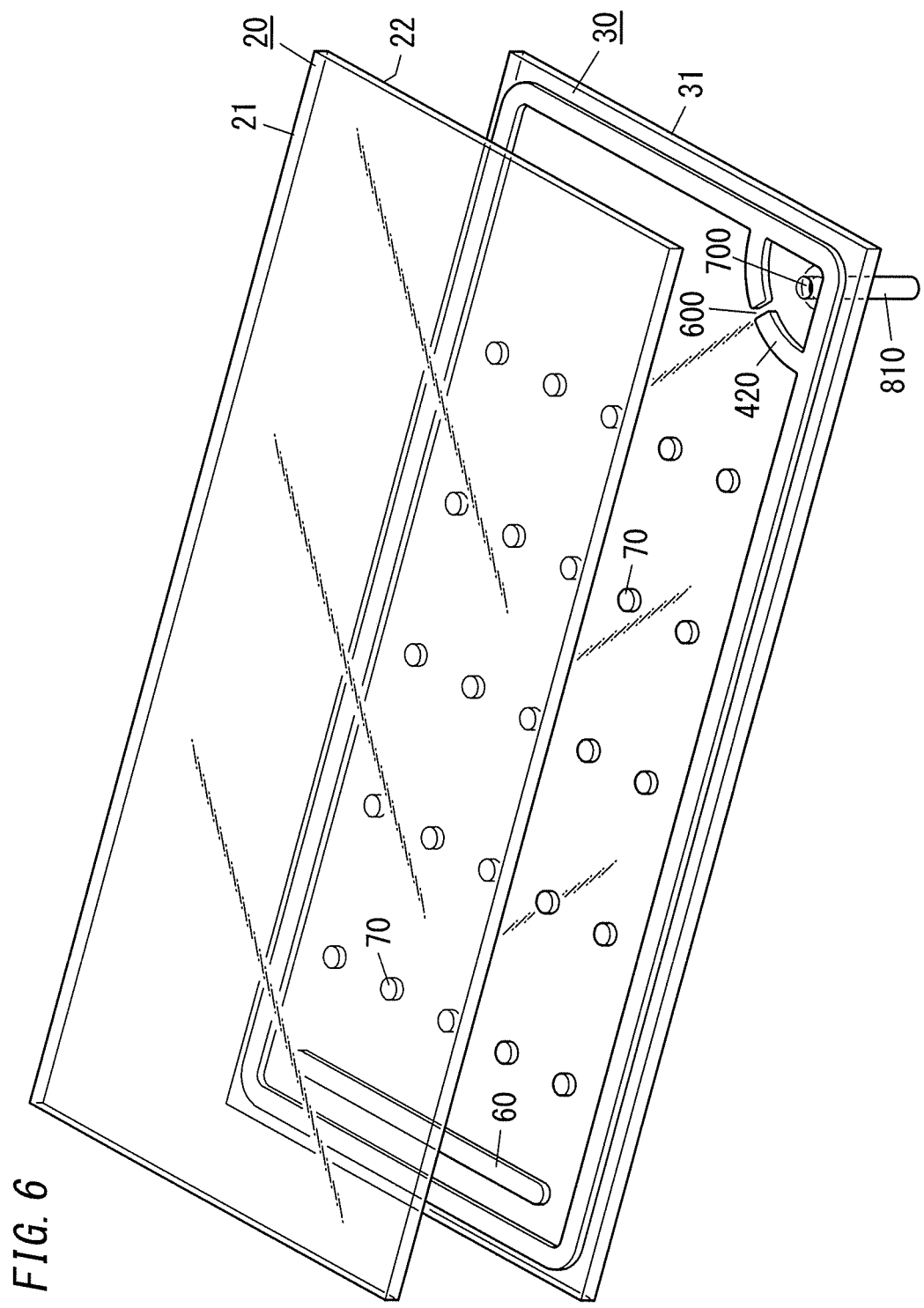
FIG. 6 illustrates the glass panel unit.

The sixth process (a disposing process) includes disposing the first pane of glass 20 and the second pane of glass 30. As shown in FIG. 6, in the sixth process, the first pane of glass 20 and the second pane of glass 30 are stacked so that the first surface of the plate glass 21 faces and runs parallel to the first surface of the plate glass 31.

The assembling process is a process of preparing the temporary assembly 100. Specifically, the assembling process includes joining the first pane of glass 20 and the second pane of glass 30, thereby preparing the temporary assembly 100. That is, the assembling process is a process (a first melting process) that includes joining the frame body 410 to the first pane of glass 20 and the second pane of glass 30 in an airtight manner.

Figure 7:
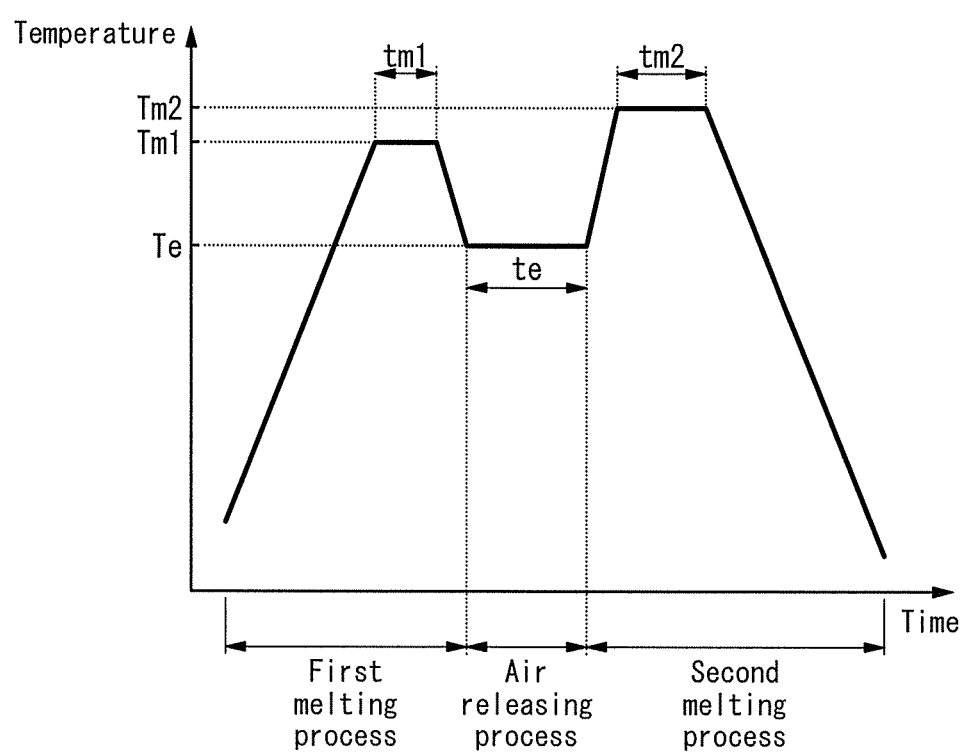
FIG. 7 illustrates the glass panel unit.

The first melting process includes once melting the first thermal bonding material at the predetermined temperature (the first melting temperature) Tm1 that is higher than or equal to the first softening point, thereby joining it to the first pane of glass 20 and the second pane of glass 30 in an airtight manner. Specifically, the first pane of glass 20 and the second pane of glass 30 are disposed in a melting furnace and heated at the first melting temperature Tm1 for predetermined time (first melting time) tm1 as shown in FIG. 7.

Though the thermal bonding material as the frame body 410 is joined to the first pane of glass 20 and the second pane of glass 30 in an airtight manner, the first melting temperature Tm1 and the first melting time tm1 are set so that the air passage 600 is not blocked by the partition 420. That is, a lower limit of the first melting temperature Tm1 is equal to the first softening point, but an upper limit of the first melting temperature Tm1 is set so that the air passage 600 is not blocked by the partition 420. For example, when each of the first softening point and the second softening point is 434° C., the first melting temperature Tm1 is set to 440° C. The first melting time tm1 is, for example ten minutes. Note that in the first melting process gas is discharged from the frame body 410, but the gas is adsorbed by the gas adsorbent 60.

Figure 8:
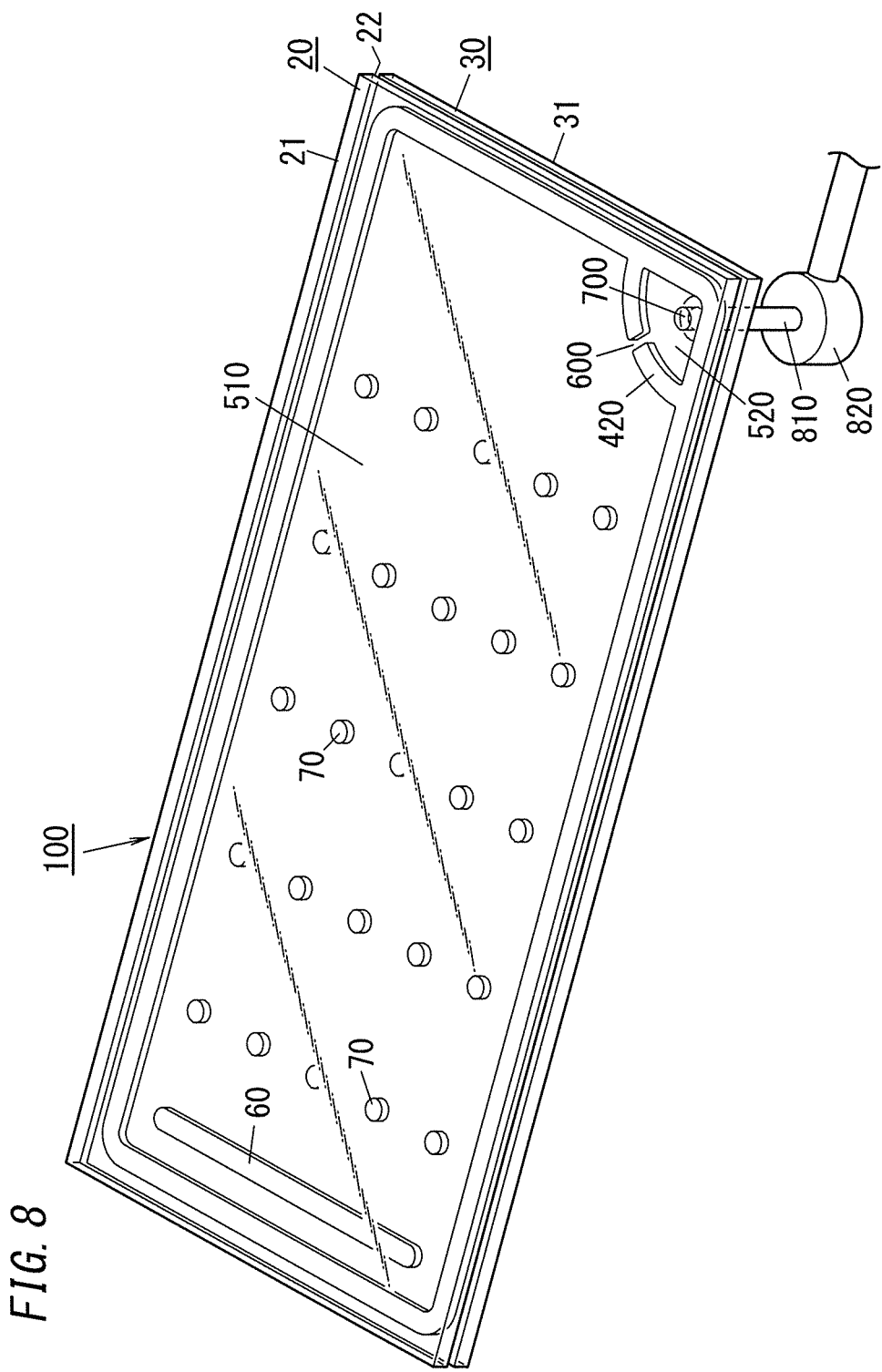
FIG. 8 illustrates the glass panel unit.

Thus, the temporary assembly 100 shown in FIG. 8 is obtained by the assembling process (the first melting process) as stated above.

The sealing process includes performing the predetermined process with respect to the temporary assembly 100, thereby obtaining the glass panel unit 10 as the finished product. The sealing process includes the air releasing process and a melting process (the second melting process). That is, the air releasing process and the second melting process correspond to the predetermined process.

The air releasing process includes releasing air from the first space 510 through the air passage 600, the second space 520 and the air release vent 700 at the predetermined temperature (the air release temperature) Te, thereby making it change to the vacuum space 50.

The air is released with, for example a vacuum pump. As shown in FIG. 8, the vacuum pump is connected to the temporary assembly 100 with an air releasing pipe 810 and a seal head 820. For example, the air releasing pipe 810 is joined to the first pane of glass 20 with the air release vent 700 communicating with the inside of the air releasing pipe 810. The seal head 820 is then attached to the air releasing pipe 810. Thus, an intake of the vacuum pump is connected to the air release vent 700.

The first melting process, the air releasing process and the second melting process are performed with the first pane of glass 20 and the second pane of glass 30 disposed in the melting furnace, where the second pane of glass 30 is provided with the frame body 410, the partition 420, the air passage 600, the air release vent 700, the gas adsorbent 60 and the spacers 70. Accordingly, the air releasing pipe 810 is joined to the second pane of glass 30 at least before the first melting process.

The air releasing process includes releasing air from the first space 510 via the air passage 600, the second space 520 and the air release vent 700 at the air release temperature Te for predetermined time (air releasing time) te (see FIG. 7).

The air release temperature Te is set to be higher than the activation temperature of the getter as the gas adsorbent 60 (e.g., 350° C.) and lower than the first softening point and second softening point (e.g., 434° C.). For example, the air release temperature Te is 390° C.

This way prevents deformation of the frame body 410 and the partition 420. The getter as the gas adsorbent 60 is activated, and molecules adsorbed by the getter (gas) are discharged from the getter. The molecules discharged from the getter (namely gas) is released via the first space 510, the air passage 600, the second space 520 and the air release vent 700. Therefore, in the air releasing process, the adsorption capacity of the gas adsorbent 60 is recovered.

The air releasing time te is set so that the vacuum space 50 has a predetermined degree of vacuum (e.g., a degree of vacuum that is 0.1 Pa or less). For example, the air releasing time te is 120 minutes.

Note that the degree of vacuum of the vacuum space 50 is not particularly limited. A decompressed space may be provided in place of the vacuum space 50, where the decompress space is filled with gas at a pressure that is lower than at least one atm, such as 0.5 atm.

The second melting process includes deforming the partition 420 to form the partition wall 42 that blocks the air passage 600, thereby forming the seal 40 that surrounds the vacuum space 50. In the second melting process, the second thermal bonding material is once melted at the predetermined temperature (the second melting temperature) Tm2 that is higher than or equal to the second softening point, and thereby the partition 420 is deformed to form the partition wall 42. Specifically, in the melting furnace, the first pane of glass 20 and the second pane of glass 30 are heated at the second melting temperature Tm2 for predetermined time (second melting time) tm2 (see FIG. 7).

The second melting temperature Tm2 and the second melting time tm2 are set so that the second thermal bonding material is softened to form the partition wall 42 that blocks the air passage 600. The lower limit of the second melting temperature Tm2 is equal to the second softening point (434° C.). Note that an object of the second melting process is to deform the partition 420 unlike the first melting process, and therefore the second melting temperature Tm2 is higher than the first melting temperature Tm1 (440° C.). For example, the second melting temperature Tm2 is 460° C. The second melting time tm2 is, for example 30 minutes.

Note that air is released in only the air releasing process before the second melting process in the first embodiment, but may be released in the second melting process.

When the partition wall 42 is formed, the vacuum space 50 is separated from the second space 520. The vacuum pump cannot therefore release air from the vacuum space 50. The frame body 410 and the partition wall 42 are heated until the second melting process is completed, and therefore gas may be discharged from the frame body 410 and the partition wall 42. However, gas discharged from the frame body 410 and the partition wall 42 is adsorbed by the gas adsorbent 60 in the vacuum space 50. It is therefore possible to prevent deterioration in the degree of vacuum of the vacuum space 50. That is, the thermal insulation efficiency is prevented from becoming worse.

Even in the first melting process, since the frame body 410 and the partition wall 42 are heated, gas may be discharged from the frame body 410 and the partition wall 42. The gas discharged from the frame body 410 and the partition wall 42 is adsorbed into the gas adsorbent 60, and therefore the adsorption capacity of the gas adsorbent 60 may be reduced in the first melting process.

The air releasing process however includes releasing air from the first space 510 at the air release temperature Te that is higher than or equal to the activation temperature of the getter as the gas adsorbent 60, thereby recovering the adsorption capacity of the gas adsorbent 60. The second melting process therefore enables the gas adsorbent 60 to sufficiently adsorb gas discharged from the frame body 410 and the partition wall 42. That is, it is possible to prevent deterioration in degree of vacuum of the vacuum space 50 caused by insufficient adsorption of gas discharged from the frame body 410 and the partition wall 42 by the gas adsorbent 60.

The second melting process includes following the air releasing process to release air from the first space 510 via the air passage 600, the second space 520 and the air release vent 700. That is, the second melting process includes deforming the partition 420 to form the partition wall 42 that blocks the air passage 600, while releasing air from the first space 510 via the air passage 600, the second space 520 and the air release vent 700 at the second melting temperature Tm2. This further prevents the deterioration in the degree of vacuum of the vacuum space 50 during the second melting process. Note that the second melting process does not necessarily include releasing air from the first space 510 via the air passage 600, the second space 520 and the air release vent 700.

The glass panel unit 10 is obtained from the preparation process, the assembling process, the sealing process and the releasing process as described above.

Figure 9:
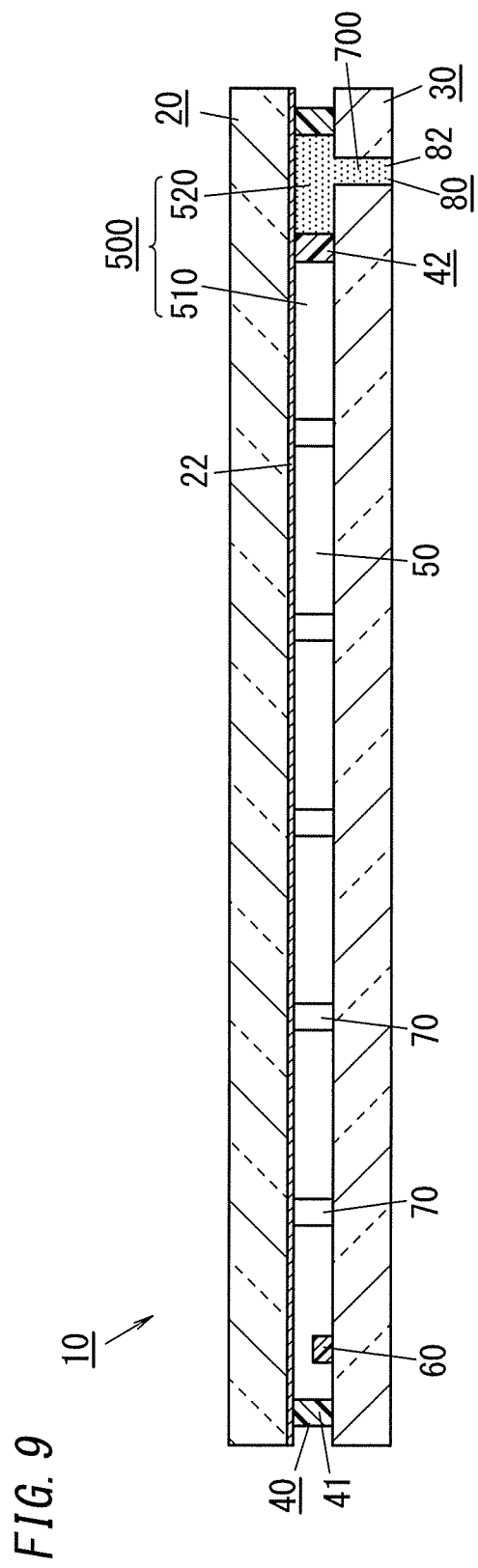
FIG. 9 is a schematic plan of a glass panel unit according to a second embodiment of the present invention.

A glass panel unit 10 according to a second embodiment will hereinafter explained with reference to FIG. 9. Note that the glass panel unit 10 according to the second embodiment is almost the same as the glass panel unit 10 according to the first embodiment, and like components are assigned the same reference numerals as depicted in the first embodiment, and different components will be mainly described.

In the second embodiment, a blocking member 80 is composed of a filler 82 disposed in an air release vent 700 and a second space 520. The filler 82 is made from, for example resin. Note that the filler 82 may be made from a substance other than the resin, but is not limited thereto. The filler 82 needn't be filled in all of the air release vent 700 and the second space 520.

Providing the filler 82 further prevents foreign matter such as dust from entering the air release vent 700 and the second space 520 when compared with the cover 81 in the first embodiment.

Figure 10:
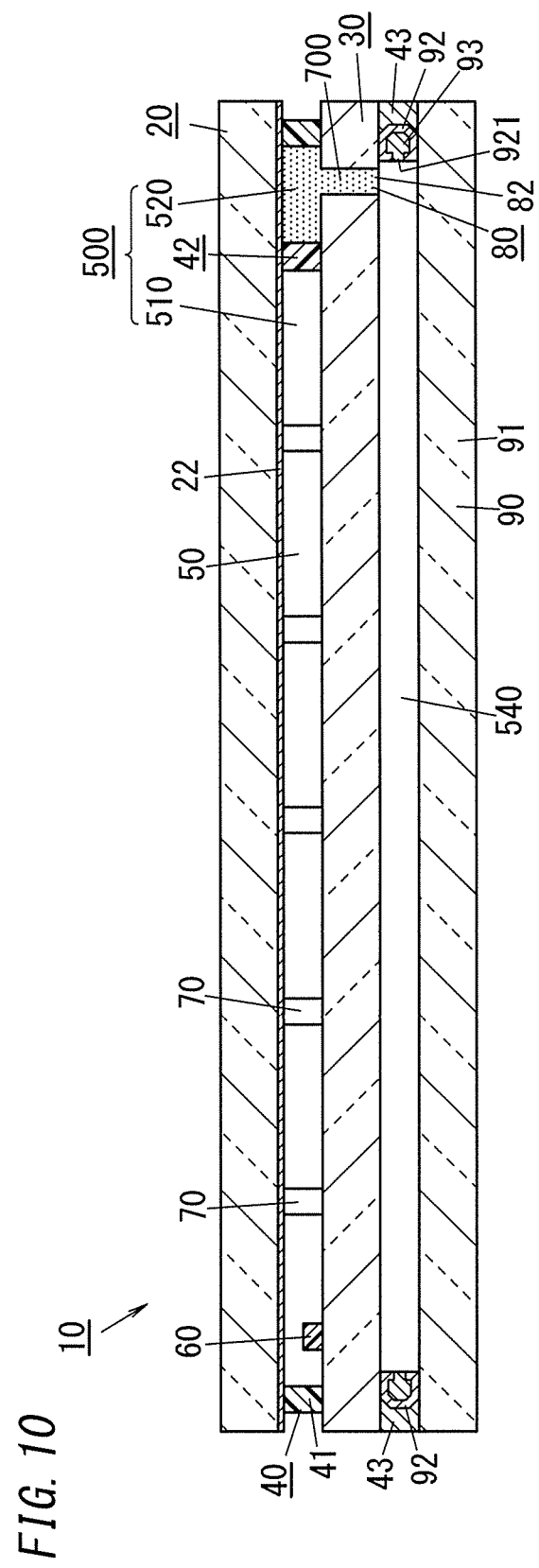
FIG. 10 is a schematic plan of a glass panel unit according to a third embodiment of the present invention.
Figure 11:
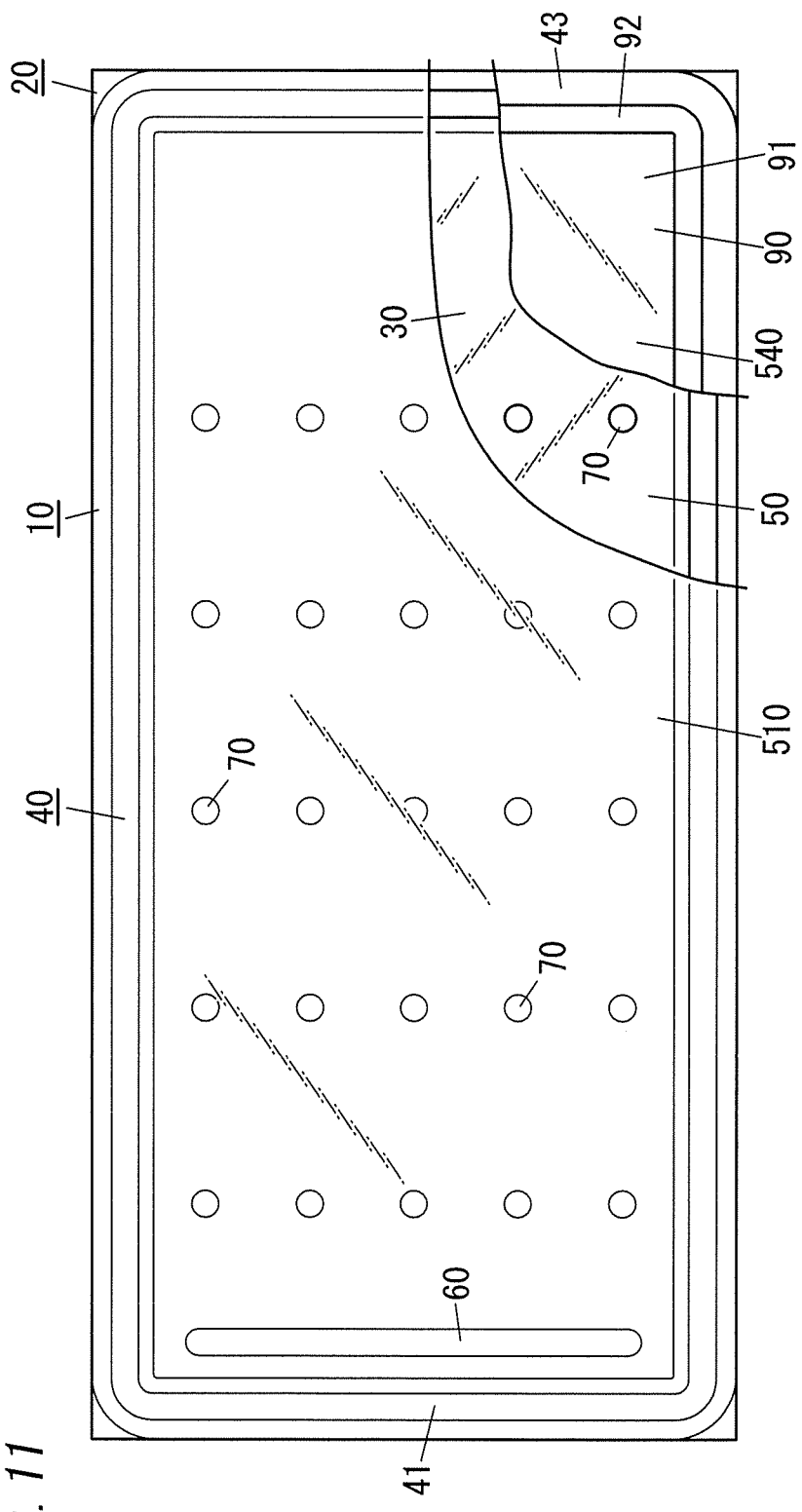
FIG. 11 is a partially broken schematic plan of the glass panel unit.

A glass panel unit 10 according to a third embodiment will hereinafter be explained with reference to FIGS. 10 and 11. Note that the glass panel unit 10 according to the third embodiment has additional components beside components like the first embodiment or the second embodiment.

The glass panel unit 10 according to the third embodiment includes a third pane of glass 90 that faces a second pane of glass 30. Note that the third pane of glass 90 faces the second pane of glass 30 in the third embodiment for the sake of convenience, but may face a first pane of glass 20.

The third pane of glass 90 includes a plate glass 91. The plate glass 91 of the third pane of glass 90 has a flat surface and a predetermined thickness. In the third embodiment, the third pane of glass 90 is composed of the plate glass 91.

Note that the third pane of glass 90 may include a coating formed on either surface thereof. The coating is a film having specific physical property like an infrared reflection film or the like. In this case, the third pane of glass 90 is composed of the plate glass 91 and the coating. In short, the third pane of glass 90 is composed of at least the plate glass 91.

The glass panel unit 10 further includes a second seal 43 that is disposed between the second pane of glass 30 and the third pane of glass 90 and joined to the second pane of glass 30 and the third pane of glass 90 in an airtight manner. In this case, a seal 40 is provided as a first seal. The second seal 43 is annular in shape and disposed between a periphery of the second pane of glass 30 and a periphery of the third pane of glass 90. The second seal 43 may be made from material that is the same as or different from that of the seal 40.

The glass panel unit 10 includes a second interior space 540 that is sealed with the second pane of glass 30, the third pane of glass 90 and the second seal 43, and filled with dry gas. In this case, an interior space 500 is provided as a first interior space. Examples of the dry gas include, but not particularly limited to, dry rare gas such as argon, and dry air.

The glass panel unit 10 includes a hollow frame member 92 that is annular in shape and disposed inside the second seal 43 between the periphery of the second pane of glass 30 and the periphery of the third pane of glass 90. The frame member 92 is formed with though holes 921 communicating with the second interior space 540, and a desiccant 93 such as, for example silica gel is housed in the frame member 92.

Joining the second pane of glass 30 and the third pane of glass 90 may be performed in the same way as joining the first pane of glass 20 and the second pane of glass 30, and an example thereof will be explained.

The example includes preparing the third pane of glass 90 and an assembly including the first pane of glass 20 and the second pane of glass 30 (glass panel unit 10 of first embodiment or second embodiment).

The example includes a thermal bonding material disposing process of disposing thermal bonding material to be the second seal 43 on a periphery of a surface of the third pane of glass 90 or the second pane of glass 30 so as to be annular in shape. The thermal bonding material may be material that is the same as or different from that of a frame body 410. This process further includes forming, in the thermal bonding material, an air passage(s) as a second air passage(s) formed of a through hole which the second interior space 540 communicates with an exterior space through.

The example includes a third pane of glass disposing process of disposing the third pane of glass 90 and the second pane of glass 30 so that they face each other.

The example includes a joining process of heating the thermal bonding material to be the second seal 43 up to the temperature for melting the thermal bonding material to once melt the thermal bonding material, thereby joining it to the second pane of glass 30 and the third pane of glass 90 in an airtight manner. Note that the process is performed so that the second air passage is not perfectly blocked.

The example includes a dry gas filling process of filling dry gas into the second interior space 540 via the second air passage. In the process, only the dry gas may be filled into the second interior space 540, or air may remain.

The example includes a second space sealing process of heating the second seal 43 to block the second air passage, thereby sealing the second interior space 540.

The glass panel unit 10 is formed by the processes as described above. The third embodiment enables an improvement in thermal insulation efficiency of the glass panel unit 10.

Figure 12:
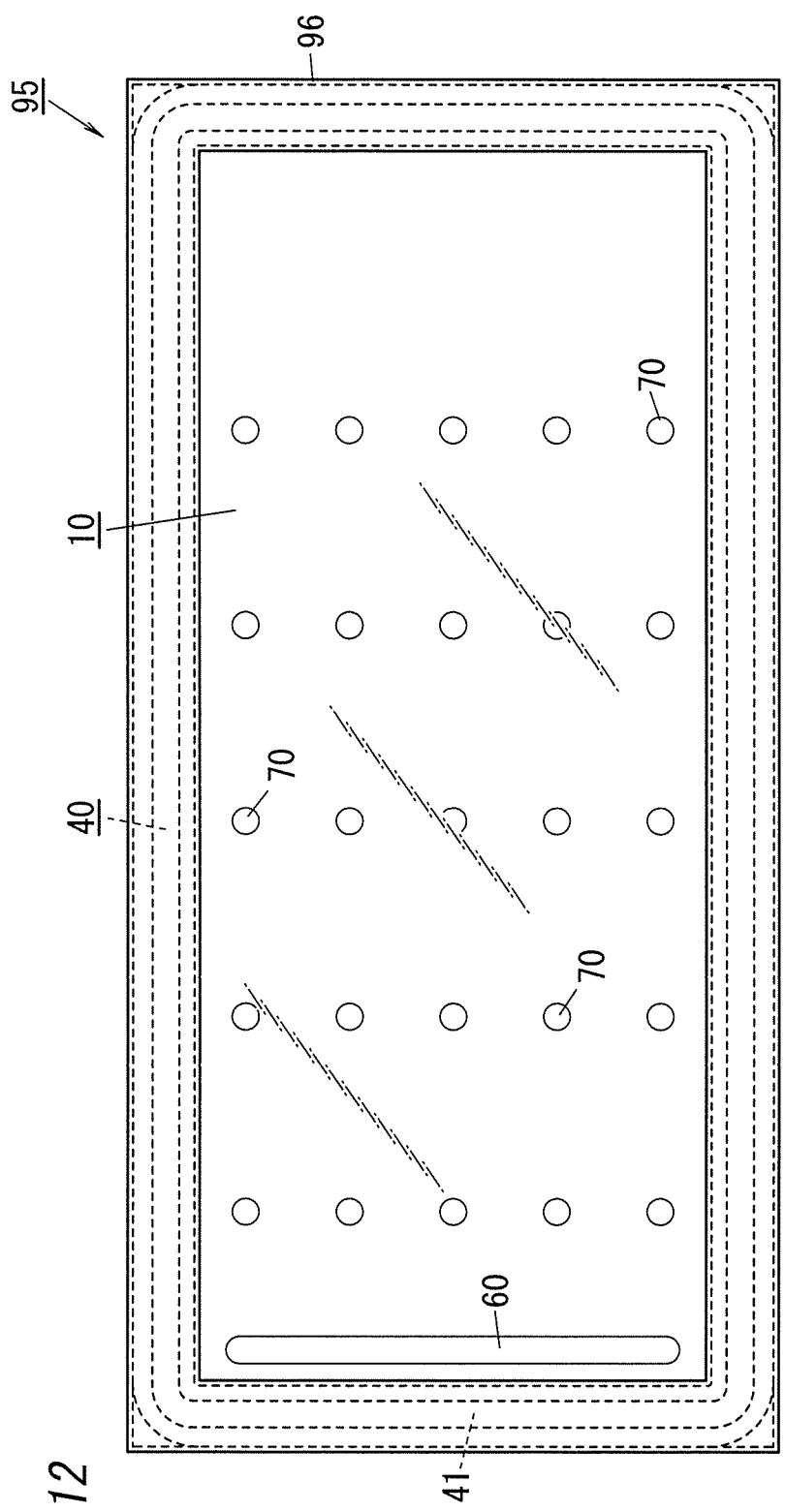
FIG. 12 is a schematic sectional view of a windowpane with a glass panel unit according to a fourth embodiment of the present invention.

A fourth embodiment will hereinafter be explained with reference to FIG. 12. Note that the fourth embodiment is a windowpane 95 that includes a glass panel unit 10 in the same way as any of the first to third embodiments.

The fourth embodiment includes the glass panel unit 10 in the same way as any of the first to third embodiments, and is formed by fitting an outer periphery of the glass panel unit 10 into a window frame 96 having a U shaped cross section.

The fourth embodiment enables an improvement in thermal insulation efficiency of the windowpane 95.

In the embodiments (namely the first to fourth embodiments), the glass panel unit 10 is rectangular in shape, but may have any shape such as a circle or a polygon. That is, each of the first pane of glass 20, the second pane of glass 30 and the seal 40 may be not rectangular in shape but have any shape such as a circle or a polygon. Note that the first pane of glass 20, the second pane of glass 30, the frame body 410 and the partition wall 42 are not limited to respective shapes in the embodiments, but may have respective shapes so that the glass panel unit 10 has a certain shape. Note that the form and size of the glass panel unit 10 are determined based on the intended use of the glass panel unit 10.

Each of the first surface and the second surface of the plate glass 21 in the first pane of glass 20 is not limited to a plane. Similarly, each of the first surface and the second surface of the plate glass 31 in the second pane of glass 30 is not limited to a plane.

The plate glass 21 of the first pane of glass 20 and the plate glass 31 of the second pane of glass 30 need not necessarily have the same plane form and the same plane size. The plate glass 21 and the plate glass 31 need not necessarily have the same thickness. The plate glass 21 and the plate glass 31 need not necessarily be made from the same material.

The seal 40 need not necessarily have the same plane form as those of the first pane of glass 20 and the second pane of glass 30. Similarly, the frame body 410 need not necessarily have the same plane form as those of the first pane of glass 20 and the second pane of glass 30.

The first pane of glass 20 may include a coating that has specific physical property and is formed on the second surface of the plate glass 21. Alternatively, the first pane of glass 20 need not necessarily have the coating 22. That is, the first pane of glass 20 may be formed of only the plate glass 21.

The second pane of glass 30 may include a coating that has specific physical property. The coating may be, for example at least one of respective thin films formed on the first and second surfaces of the plate glass 31. Examples of the coating include an infrared reflection film and a ultraviolet ray reflection film that reflect light having specific wavelength.

In the embodiments, the frame body 410 is made from the first thermal bonding material. However, the frame body 410 may include one of other factors such as a core member besides the first thermal bonding material. That is, the frame body 410 needs to include the first thermal bonding material. In the embodiments, the frame body 410 is formed to surround almost every region of the second pane of glass 30. However, the frame body 410 may be formed to surround a predetermined region on the second pane of glass 30. That is, the frame body 410 need not necessarily be formed to surround almost every region of the second pane of glass 30.

In the embodiments, the partition 420 is made from the second thermal bonding material. However, the partition 420 may include one of other factors such as a core member besides the second thermal bonding material. That is, the partition 420 needs to include the second thermal bonding material.

In the embodiments, the interior space 500 is divided into one first space 510 and one second space 520. However, the interior space 500 may be divided into one or more first spaces 510 and one or more second spaces 520.

In the embodiments, the second thermal bonding material is the same as the second thermal bonding material, and the first softening point is equal to the second softening point. However, the second thermal bonding material may be different material from the first thermal bonding material. For example, the second thermal bonding material may have a second softening point different from the first softening point of the second thermal bonding material. Here, the second softening point is preferably higher than the first softening point. This enables the first melting temperature Tm1 to be greater than or equal to the first softening point and less than or equal to the second softening point. This way prevents the deformation of the partition 420 in the first melting process.

Each of the first thermal bonding material and the second thermal bonding material is not limited to glass frit, but examples thereof may further include low melting metal and hot melt adhesive.

In the embodiments, the frame body 410, the gas adsorbent 60 and the partition 420 are heated with the melting furnace. However, they may be heated with an appropriate heating means. Examples of the heating means include a laser, and a heat exchanger plate connected to a heat source.

In the embodiments, the air release vent 700 is formed in the second pane of glass 30. However, the air release vent 700 may be formed in the plate glass 21 of the first pane of glass 20, or in the frame body 410.

In the embodiments, the getter as the gas adsorbent 60 is the evaporation type getter, but may be a non-evaporation type getter. Under a specific activation temperature or higher, adsorbed molecules enter the non-evaporation type getter, and thereby adsorption capacity of the non-evaporation type getter is recovered. However, the adsorbed molecules are not discharged unlike the evaporation type getter. Therefore, the non-evaporation type getter adsorbs specified amount or more of molecules and then the adsorption capacity is hardly recovered even if being heated at the activation temperature or higher.

In the embodiments, the gas adsorbent 60 is elongated in shape, but may be one of other shapes. The gas adsorbent 60 need not necessarily be at an end of the vacuum space 50. In the embodiments, the gas adsorbent 60 is formed by applying the solution in which grains in the granular material as the getter are dispersed. However, the gas adsorbent 60 may include a substrate and a getter fixed to the substrate. Such the gas adsorbent 60 can be obtained by drying the substrate immersed in the solution in which grains in the granular material as the getter are dispersed. Note that the substrate may have an arbitrary shape such as, for example an elongated rectangular shape.

Alternatively, the gas adsorbent 60 may be a film formed on all or part of the first surface of the plate glass 31 of the second pane of glass 30. Such the gas adsorbent 60 can be obtained by coating the first surface of the plate glass 31 of the second pane of glass 30 with the solution in which grains in the granular material as the getter are dispersed.

The gas adsorbent 60 may be contained in each of the spacers 70. For example, each spacer 70 containing the gas adsorbent 60 can be obtained by making each spacer 70 from material containing a getter.

The gas adsorbent 60 may be solid matter formed of a getter. Such the gas adsorbent 60 is comparatively large and may be unable to be disposed between the first pane of glass 20 and the second pane of glass 30. In this case, a recess may be formed in the plate glass 31 of the first pane of glass 30 so that the gas adsorbent 60 is disposed in the recess.

The gas adsorbent 60 may be disposed in a package in advance so as to prevent the getter from adsorbing molecules. This case requires destroying the package to expose the gas adsorbent 60 to the vacuum space 50.

In the embodiments, the glass panel unit 10 includes spacers 70, but may include one spacer 70. Alternatively, the glass panel unit 10 need not necessarily include the spacers 70.

As can clearly be seen from the first to fourth embodiments, a glass panel unit 10 according to a first aspect of the present invention includes a first pane of glass 20, a second pane of glass 30, a seal 40, an interior space 500, a partition wall 42, an air release vent 700 and a blocking member 80. The second pane of glass 30 faces the first pane of glass 20 with the two panes of glass spaced a predetermined interval apart. The seal 40 that is disposed between the first pane of glass 20 and the second pane of glass 30 and joined to the first pane of glass 20 and the second pane of glass 30 in an airtight manner. The interior space 500 is encompassed with the first pane of glass 20, the second pane of glass 30 and the seal 40. The partition wall 42 is disposed in the interior space 500 and divides the interior space 500 into a first space 510 as a vacuum space and a second space 520. The air release vent 700 is formed in the first pane of glass 20 or the second pane of glass 30 and communicates with the second space 520. The blocking member 80 is provided in the air release vent 700.

With the glass panel unit 10 according to the first aspect, the blocking member 80 is provided in the air release vent 700, thereby preventing foreign matter such as dust from entering the second space 520 via the air release vent 700. It is accordingly possible to prevent foreign matter such as dust from entering the air release vent 700 or the second space 520 to deteriorate the appearance of the glass panel unit 10.

A glass panel unit 10 according to a second aspect of the present invention is realized by combination with the first aspect. In the glass panel unit 10 according to the second aspect, the blocking member 80 is a cover 81 that is provided on a surface side of the air release vent 700 in the first pane of glass 20 or the second pane of glass 30.

The glass panel unit 10 according to the second aspect enables easy production of the blocking member 80.

A glass panel unit 10 according to a third aspect of the present invention is realized by combination with the first aspect. In the glass panel unit 10 according to the third aspect, the blocking member 80 is a filler 82 that is disposed in the air release vent 700 and the second space 520.

The glass panel unit 10 according to the third aspect further prevents foreign matter such as dust from entering the air release vent 700 and the second space 520.

A glass panel unit 10 according to a fourth aspect of the present invention is realized by combination with any one of the first to third aspects. The glass panel unit 10 according to the fourth aspect includes a third pane of glass 90 that faces the second pane of glass 30. The glass panel unit 10 also includes a second seal 43 that is disposed between the second pane of glass 30 and the third pane of glass 90 and joined to the second pane of glass 30 and the third pane of glass 90 in an airtight manner. The glass panel unit 10 further includes a second interior space 540 that is sealed with the second pane of glass 30, the third pane of glass 90 and the second seal 43 and filled with dry gas.

The fourth aspect enables an improvement in thermal insulation efficiency of the glass panel unit 10.

A windowpane 95 according to a first aspect of the present invention includes a glass panel unit 10 of any one of the first to fourth aspects, and a window frame 96 that a periphery of the glass panel unit 10 is fit in.

The first aspect enables an improvement in thermal insulation efficiency of the windowpane 95.

REFERENCE SIGNS LIST

10 Glass panel unit
20 First pane of glass
30 Second pane of glass
40 Seal
42 Partition wall
43 Second seal
500 Interior space
510 First space
520 Second space
540 Second interior space
700 Air release vent
80 Blocking member 81 Cover
82 Filler
90 Third pane of glass
95 Windowpane
96 Window frame

The invention claimed is:

1. A glass panel unit, comprising
a first pane of glass,
a second pane of glass that faces the first pane of glass with the first pane of glass and the second pane of glass spaced a predetermined interval apart,
a seal that is disposed between the first pane of glass and the second pane of glass and joined to the first pane of glass and the second pane of glass in an airtight manner,
an interior space that is encompassed with the first pane of glass, the second pane of glass and the seal,
a partition wall that is disposed in the interior space and divides the interior space into a first space and a second space so that the first space is a vacuum space and the second space is a non-vacuum space,
an air release vent that is formed in the first pane of glass or the second pane of glass and communicates with the second space, and
a blocking member that is provided in the air release vent, the blocking member being composed of a filler disposed in all of the air release vent and the second space so as to fill the air release vent and the second space.

2. The glass panel unit of claim 1, further comprising:
a third pane of glass that faces the second pane of glass,
a second seal that is disposed between the second pane of glass and the third pane of glass and joined to the second pane of glass and the third pane of glass in an airtight manner, and
a second interior space that is sealed with the second pane of glass, the third pane of glass and the second seal and filled with dry gas.

3. A windowpane, comprising:
a glass panel unit of claim 1, and
a window frame that a periphery of the glass panel unit is fit in.

4. A windowpane, comprising:
a glass panel unit of claim 2, and
a window frame that a periphery of the glass panel unit is fit in.

* * * * *